United States Patent [19]

Lee

[11] Patent Number: 5,771,335
[45] Date of Patent: Jun. 23, 1998

[54] FAST FORWARD/REVERSE TRAVEL CONTROLLING METHOD FOR VIDEO ON DEMAND SYSTEM

[75] Inventor: Seung Hwan Lee, Seoul, Rep. of Korea

[73] Assignee: LG Electronics Inc., Seoul, Rep. of Korea

[21] Appl. No.: 577,219

[22] Filed: Dec. 22, 1995

[30]    Foreign Application Priority Data

Jan. 25, 1995 [KR] Rep. of Korea ............ 1995/1273

[51] Int. Cl.$^6$ ............................................. H04N 5/76
[52] U.S. Cl. ........................... 386/111; 386/124; 386/68
[58] Field of Search ............................... 358/335, 342,
358/312; 360/10.1, 10.3, 27, 33.1, 48, 72.2;
386/111, 124, 70, 68, 46, 96, 95, 125, 126;
369/32; H04N 5/76

[56]          References Cited

U.S. PATENT DOCUMENTS

| | | |
|---|---|---|
| 5,239,382 | 8/1993 | Hatakenaka et al. ............ 358/335 |
| 5,282,049 | 1/1994 | Hatakenaka et al. ............ 358/335 |
| 5,455,684 | 10/1995 | Fujinami et al. ............... 358/335 |
| 5,477,397 | 12/1995 | Naimpally et al. ............. 360/10.3 |
| 5,479,303 | 12/1995 | Suzuki et al. ................. 360/72.2 |
| 5,594,709 | 1/1997 | Nagano et al. ................ 369/32 |
| 5,596,564 | 1/1997 | Fukushima et al. ............. 386/70 |

*Primary Examiner*—Tommy P. Chin
*Assistant Examiner*—Luanne Din

[57]          ABSTRACT

A fast forward/reverse travelling controlling method in a VOD system using a MPEG 1 which can perform a fast forward/reverse travelling control in real-time processing with respect to video data of a moving picture by preparing a simple I table (I_TABLE) and can control the fast forward/reverse travelling speed using a step value. transmitted to a settop box.

15 Claims, 4 Drawing Sheets

FAST FORWARD/REVERSE TRAVEL CONTROLLING METHOD FOR VIDEO ON DEMAND SYSTEM

BACKGROUND OF THE INVENTION

The present invention relates to a fast forward/reverse travelling control method in a video on demand (VOD) system, and more particularly, to a fast forward/reverse travelling controlling method in a VOD system which can perform a fast forward/reverse travelling control in real-time processing with respect to video data of a moving picture transmitted to a settop box.

Up to now, there has been no case of implementing fast forward/reverse travelling (fast playback, search, fast transmission or fast return) in a VOD system using a moving picture expert group (MPEG) 1.

However, a video-CD or CD-ROM adopts a method for implementing the fast forward/reverse travelling by repeating the processes of reading a packet from a MPEG 1 file to determine whether it is an intra-coded (I) frame and then transmitting the read packet to an MPEG decoder if the read packet is an I-frame. According to such a method, since a packet is read from the MPEG 1 file one by one during fast forward/reverse travelling to search I-frames, much time is needed, which makes it difficult to be adopted for a system requiring a real-time processing such as a VOD system. Also, a fast forward/reverse travelling speed cannot be controlled.

SUMMARY OF THE INVENTION

Therefore, it is an object of the present invention to provide a fast forward/reverse travelling controlling method of a VOD system using a MPEG 1 which can implement a fast forward/reverse travelling in realtime processing with respect to video data of a moving picture by preparing a simple I table (I_TABLE) and which can control the fast forward/reverse travelling speed using a step value.

To accomplish the above and other object, there is provided a fast forward/reverse travelling controlling method comprising the steps of: reading a packet from an MPEG 1 file during a normal play mode to prepare an I table in a data format of the I table which corresponds to the packet of the MPEG 1; reading the I table to transmit a video packet as an I table pointer is increased by an I table size by referring to the I table during conversion from the normal play mode to a fast forward play mode; and reading the I table to transmit a video packet as an I table pointer is decreased in an I table size by referring to the I table during conversion from the normal play mode to a fast reverse travelling mode.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The above and other objects and advantages of the present invention will become more apparent by describing in detail a preferred embodiment thereof with reference to the attached drawings in which.

DETAILED DESCRIPTION OF THE PREFERRED EMBODIMENTS

Figure 1:
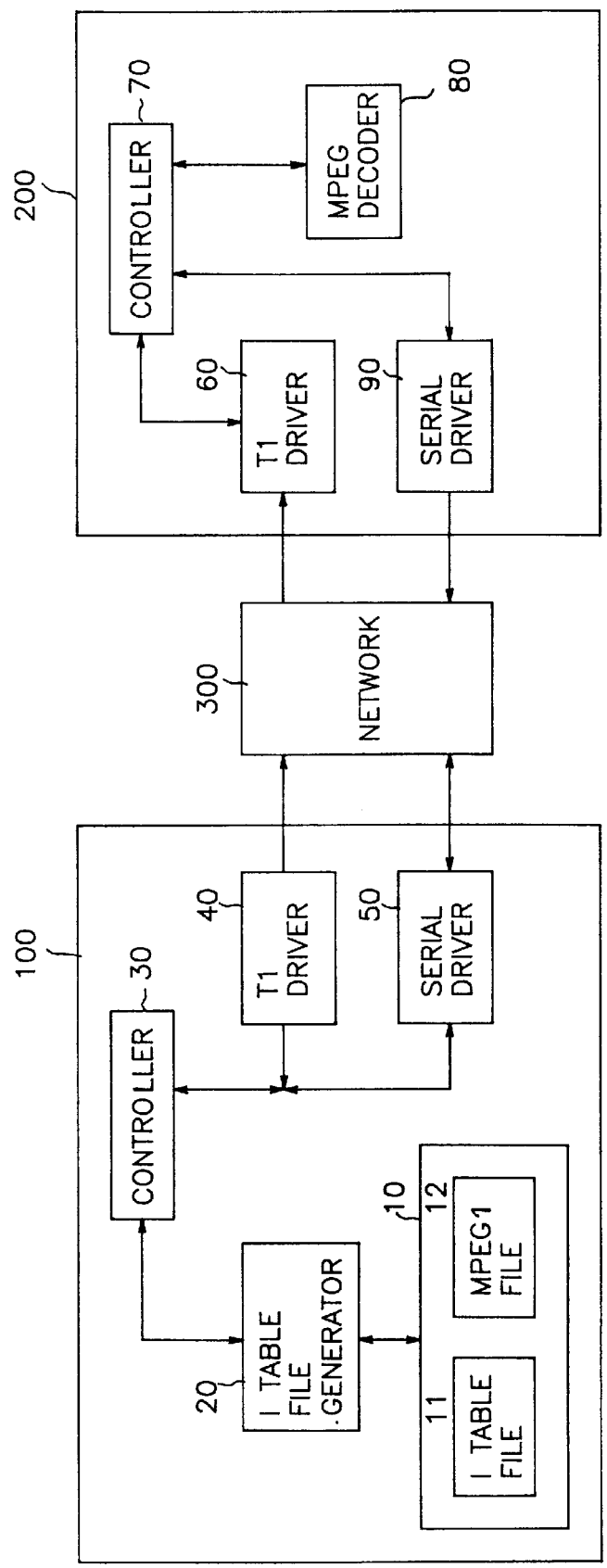
FIG. 1 is a schematic diagram of a VOD system according to the embodiments of the present invention.

As shown in FIG. 1, the VOD system according to the embodiments of the present invention includes a server 100, a settop box 200 and a network 300 connecting server 100 and settop box 200.

Server 100 includes a hard disk 10 having an I table file 11 and an MPEG 1 file 12 for storing a large quantity of data, an I table file generator 20 for reading a packet from MPEG 1 file 12 of hard disk 10 to prepare the I table corresponding to the packet I Table, storing the in the I table file 11 and outputting data by referring to the prepared I table, a controller 30 for receiving the data output from I table file generator 20 to execute an overall control operation, a telecommunication driver (to be referred to as a T1 driver, hereinafter) 40 for transmitting the data output from controller 30, and a serial driver 50 for outputting a user's request transmitted from settop box 200 to controller 30.

Settop box 200 includes a T1 driver 60 for receiving data transmitted from server 100, a controller 70 for executing an overall control operation of settop box 200, an MPEG decoder 80 for receiving the output of T1 driver 60 through controller 70 to execute a decoding operation and output the decoding result to a VTR, and a serial driver 90 for receiving a user's request through controller 70 to transmit the received request to server 100.

The operation of the VOD system having the aforementioned configuration will now be described with reference to accompanying drawings.

First, if the user sets a normal play mode, controller 70 recognizes the set mode and outputs a control signal to server 100 through serial driver 90 of settop box 200 and network 300.

Subsequently, serial driver 50 of server 100 receives the control signal to output the same to controller 30. Controller 30 controls I table file generator 20 to read data from MPEG 1 file 12 of hard disk 10 and then transmit the data to settop box 200 through T1 driver 40 and network 300.

T1 driver 60 of settop box 200 receives the transmitted data to output the same to MPEG decoder 80 through controller 70. MPEG decoder 80 executes a decoding operation on the received data to output video data of a moving picture to a TV receiver.

The construction of the I table by I table file generator 20 and the preparing sequence therefor will now be described.

First, the data of the I table is prepared based on the data stored in MPEG file 12 MPEG file 12 shows a plurality of group of pictures (GOPs), and I table is prepared for each GOP stored in MPEG file 12. The I table includes a GOP_NUM representing the number of each group of picture (GOP), a FILE_OFFSET representing the start position of GOP, in MPEG file 12 a GOP_IND which is an indicator of the start of the GOP, a PIC_NUM representing the number of packets of I-frames included in the GOP, and an AUD_NUM representing the number of audio packets inserted in the middle of I-frame.

The FILE-OFFSET is a file pointer value to be changed at a fast forward/reverse travelling time, from which the PIC_NUM and AUD_NUM are read.

Figure 2:
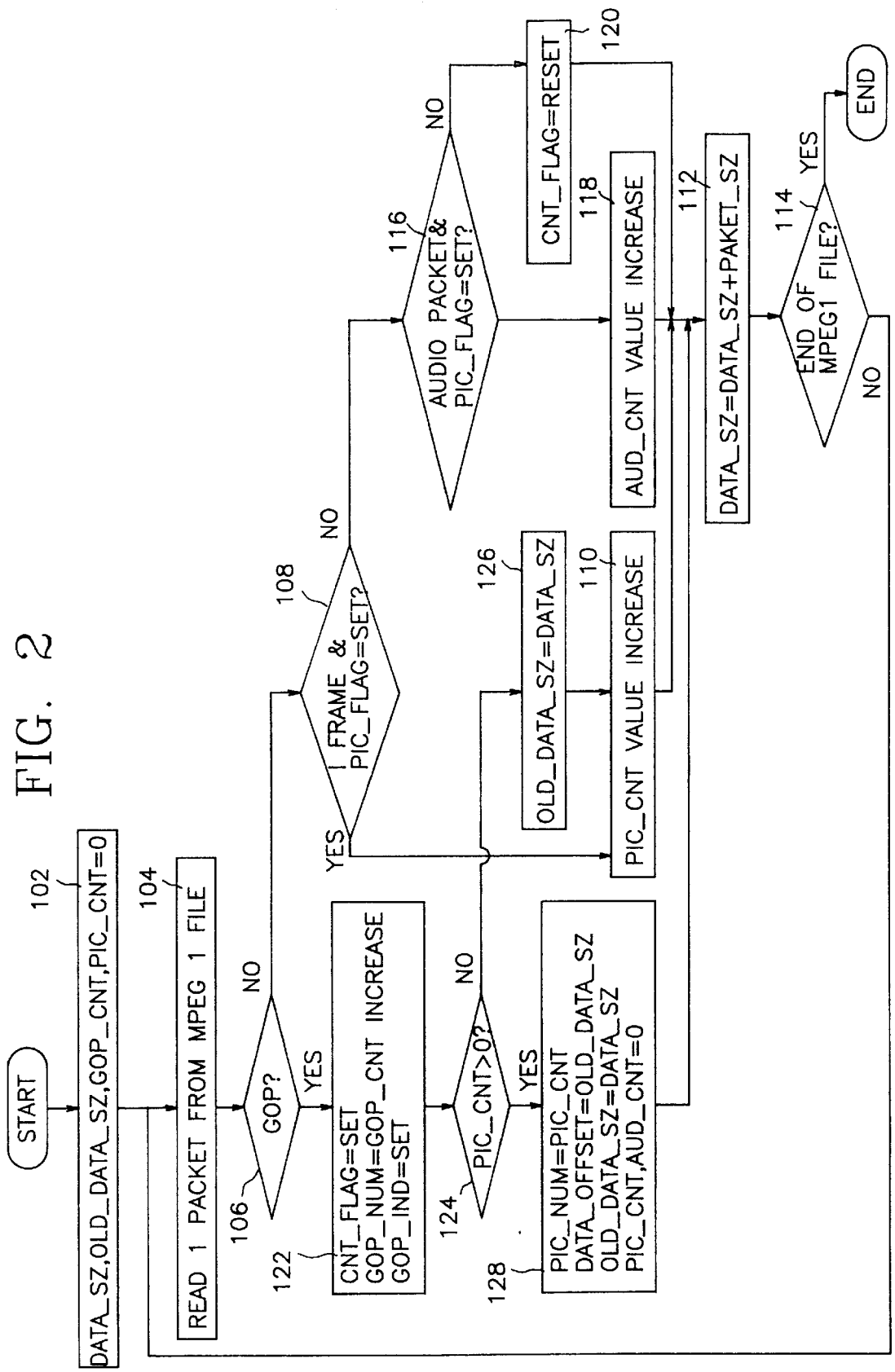
FIG. 2 is a flowchart showing a process of preparing an I table in the present invention.

Therefore, I table file generator 20 prepares the I table having the aforementioned construction, the process of which is shown in FIG. 2.

First, I table file generator 20 executes initialization for setting data size (data_sz and old data_sz), a GOP coefficient (GOP_CNT) which is an increment in MPEG file 12 and a picture coefficient (PIC_CNT) representing the number of video packets in MPEG file 12 as "0" respectively (step 102).

Subsequently, a packet is read from MPEG file 12 and it is detected whether the read packet is a GOP, i.e., a video packet, or an audio packet, and whether or not the read packet contains the start code of GOP (steps 104 and 106).

At this time, since MPEG file 12 is composed of 2324-byte video packets and 2304-byte audio packets, I table file generator 20 determines by the packet size whether the read packet is a video packet or audio packet.

If the packet read from MPEG file 12 in step 106 is not GOP, i.e., the read packet is not a video packet nor contains the start code of GOP, I table file generator 20 checks whether or not an I-frame and a count flag (CNT_FLAG) are set. If they are set, the value of the picture coefficient (PIC_CNT) is increased by one, and the data size is increased by the packet size (paket_sz) and then it is checked whether it is an end of MPEG 1 file 12. If it is not the end, the process returns to step 104 to read the next packet of MPEG 1 file 12 (steps 108, 110, 112, 114 and 104).

On the other hand, if the I-frame and count flag (CNT_FLAG) are not set in step 108, it is checked whether or not an audio packet and count flag (CNT_FLAG) are set. If they are set, the value of the audio count (AUD_CNT) is increased by one, and the data size is increased by the audio packet size (paket_sz=2304 bytes) and then it is checked whether it is an end of MPEG 1 file 12. If not the end, the process returns to step 104 to read the next packet of MPEG 1 file 12 (steps 116, 118, 112, 114 and 104).

In other words, since audio data is coded independently from video data, the number of audio packets inserted in the middle of the I-frame is also counted.

If the audio packet and count flag (CNT_FLAG) are not set in step 116, the count flag (CNT_FLAG) is reset, the data size (data_sz) is increased by the video packet size (paket_sz=2325 bytes) and then it is checked whether or not it is an end of MPEG file 12. If it is not the end the next packet of MPEG 1 file 12 is read (steps 120, 112, 114 and 104).

If the read packet is GOP, the count flag (CNT_FLAG) is set, the GOP coefficient (GOP_CNT) is increased by one, and then the GOP start indicator (GOP_IND) is set in MPEG file 12 (steps 106 and 122).

Subsequently, it is checked whether or not the value of the picture coefficient (PIC_CNT) is greater than 0. If the picture coefficient (PIC_CNT) is smaller than 0, the old data size (old_data_sz) is set as data size (data_sz), the picture coefficient (PIC_CNT) value is increased by one, the data size is increased by the video packet size (paket_sz=2324 bytes) and then it is checked whether or not it is the end of MPEG 1 file 12. If it is not the end, the next packet of MPEG 1 file 12 is read (steps 126, 110, 112, 114 and 104).

On the other hand, if it is detected in step 124 that the picture coefficient (PIC_CNT) is greater than 0, the picture coefficient (PIC_CNT) value is set as the number of run I-frames (PIC_NUM) contained in GOP, the data offset (data_offset) is set as the old data size (old data_sz) prior to the starting of GOP, the old data size (old data_sz) is set as the current data size containing GOP, and then the next picture coefficient (PIC_CNT) value and audio coefficient (AUD_CNT) value are set as "0," respectively (step 128).

Subsequently, the data size (data_sz) is increased by the video packet size (paket_sz=2325 bytes) and then it is checked whether or not it is an end of MPEG 1 file 12. If not the end, the next packet of MPEG 1 file 12 is read (steps 112, 114 and 104).

Therefore, as described above, I table file generator 20 sequentially reads packets from MPEG 1 file 12 to prepare the I table corresponding to each GOP in MPEG 1 file 12 and then store the same in I table file 11 of the hard disk 10.

Thereafter, if the user operates a fast forward/reverse travelling control during the normal play mode, I table file generator 20 executes the travelling control by referring to the already prepared I table. The operation of switching between different modes by using the prepared I tables is as follows.

Figure 3:
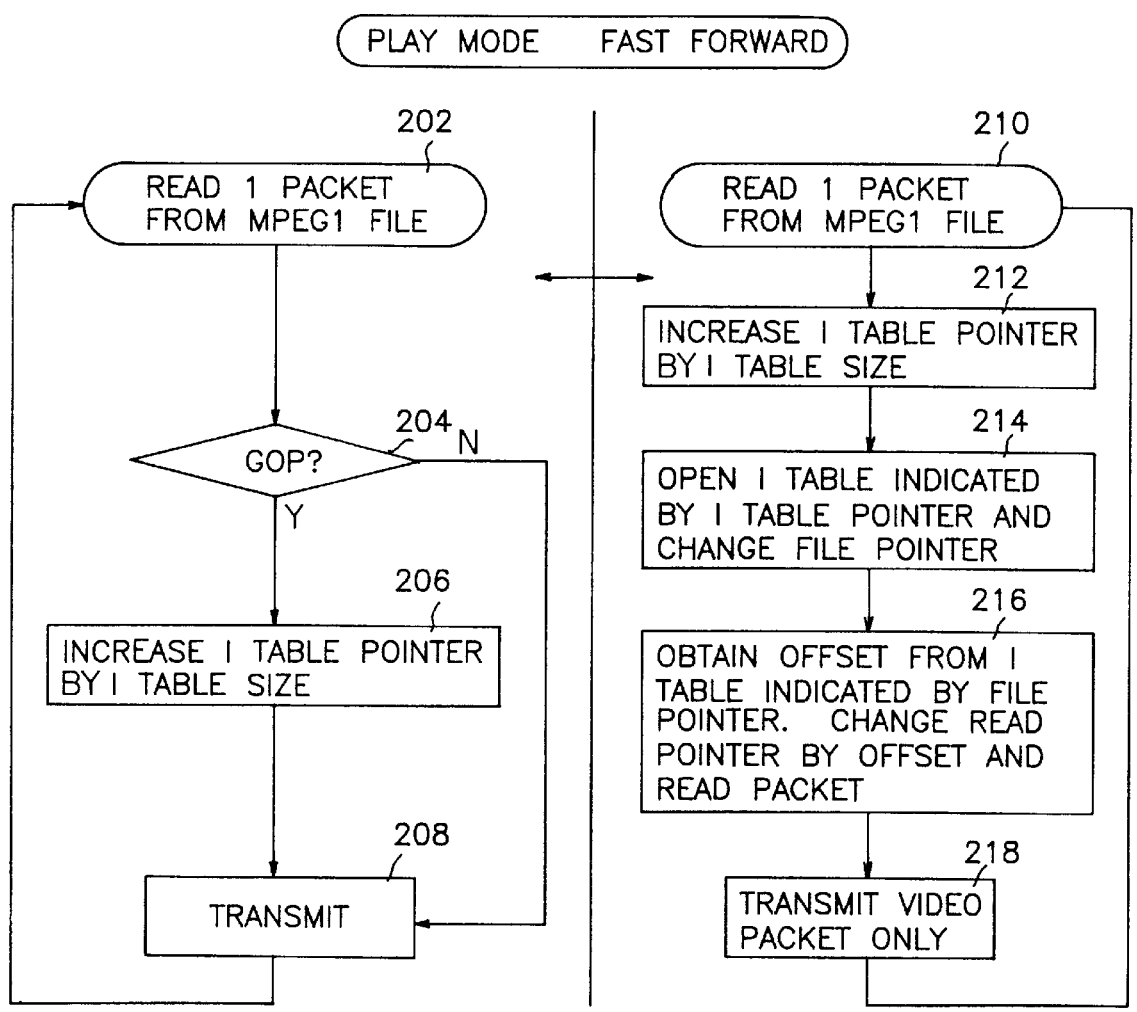
FIG. 3 is a mode conversion flowchart showing a fast forward between a mode and a normal play mode according to the present invention.

First, if the normal play mode is set by the user, as shown in FIG. 3, I table file generator 20 reads one packet from MPEG 1 file 12 and then it is detected whether the read packet, is a GOP, i.e., an audio packet, or a video packet, and whether or not the read packet contains the start code of GOP (steps 202).

At this time, if the read packet is a GOP, I table file generator 20 increases by the I table size (12 bytes) an I table pointer (I_TABLE_PTR) value representing the position of the I table currently being played and transmits the same (steps 206 and 208). If the read packet is not a GOP, it is repeatedly transmitted as it is, thereby outputting the video data stored in MPEG 1 file 12.

Thereafter, if the user sets a fast forward travelling mode, as shown in FIG. 3, I table file generator 20 reads a packet from MPEG 1 file 12 and the I table pointer (I_TABLE_PTR) value is increased by the I table size (12 bytes). Then I table file generator 20"; reads the I table pointer (I_TABLE_PTR) value representing the position of the I table currently being played and reads I table indicated by the I table pointer (I_TABLE_PTR), thereby obtaining a file offset (FILE_OFFSET). As discussed above, the file offset (FILE-OFFSET) in the I table indicates the start position of the GOP in MPEG I file 12.

Subsequently, a read pointer of the current MPEG 1 file 12 is set as the file offset (FILE_OFFSET) value, and then the I-frame packet number (PIC_NUM) * the video packet size (V_PACKSEZE)+the audio packet number (AUD_NUM) inserted to the I-frame * the audio packet size (A_PACKSIZE)) are read from the read pointer of the current MPEG 1 file to then transit the video packet only. during the fast forward travelling mode. The above equation determines the size of one GOP. Here, the PIC_NUM and AUD_NUM are data stored in the I table, while V_PACKSIZE and A_PACKSIZE are constants In other words, I table file generator 20 reads a packet from MPEG 1 file 12 to increase the I table pointer (I_TABLE_PTR) value by the I table size (12 bytes) and then opens the I table file 11 indicated by the I table pointer (I_TABLE_PTR) to change the file pointer (steps 210, 212 and 214). Using the predetermined data stored in the I table file corresponding to the current packet, the size of the GOP is determined to transmit the video packet only.

The I table indicated by the changed file pointer is read to obtain the file offset (FILE_OFFSET) and then the value of the file offset (FILE_OFFSET) is changed into the read pointer of MPEG 1 file 12 (step 216).

The I-frame packet number (PIC_NUM) * the video packet size (V_PACKSIZE)+the audio packet number (AUD_NUM) * the audio packet size (A_PACKSIZE) is determined and read from the thus-changed read pointer to then transmit the video packet only. Then, the I table pointer is again increased by the I table size (I_TABLE_SZ) and the operations following after step 210 are repeated (step 218).

In case of returning to the normal play mode during the fast forward travelling, the I table pointer next to the currently being transmitted GOP is read to obtain the file offset (FILE_OFFSET) and then the read pointer of MPEG 1 file 12 is changed into the file offset (FILE_OFFSET) value to return to the normal play mode.

Figure 4:
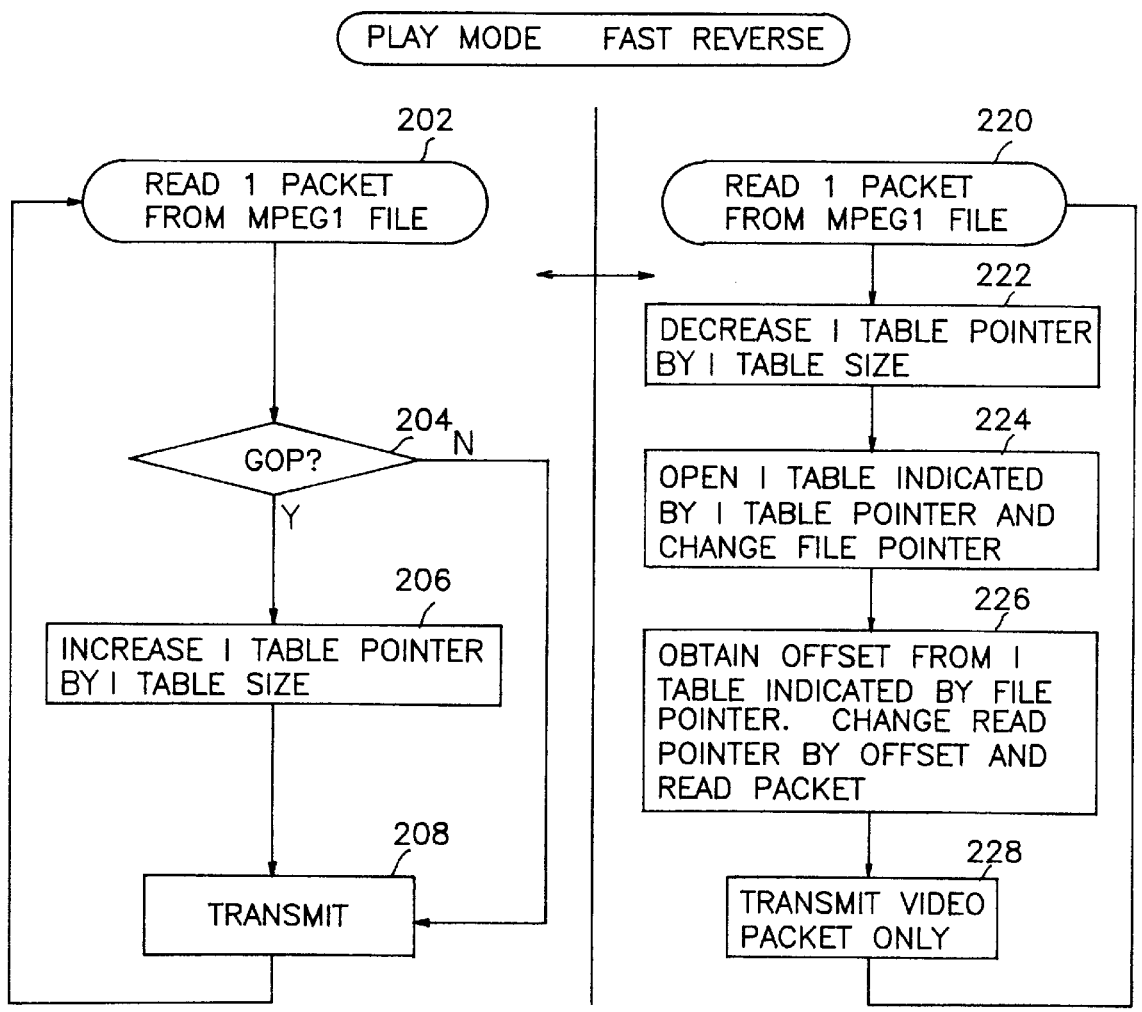
FIG. 4 is a flowchart showing a mode a fast reverse conversion between mode and a normal play mode according to the present invention.

If the user sets a fast reverse travelling during the normal play mode, I table file generator 20 reads a packet from MPEG 1 file 12 to then decrease the I table pointer (I_TABLE_PTR) value by the I table size (12 bytes) and then reads the I table indicated by the I table pointer (I_TABLE_PTR) to obtain the file offset (FILE_OFFSET), as shown in FIG. 4.

Subsequently, the read pointer of the current MPEG 1 file 12 is set as the file offset (FILE_OFFSET) value, and then the I-frame packet number (PIC_NUM) * the video packet size (V_PACKSIZE)+the audio packet number (AUD_NUM) inserted to the I-frame * the audio packet size (A_PACKSIZE) are read from the read pointer to transmit the video packet only.

In other words, I table file generator 20 reads a packet from MPEG 1 file 12 to then decrease the I table pointer (I_TABLE_PTR) value by the I table size (12 bytes) and then opens the I table file 11 indicated by the I table pointer (I_TABLE_PTR) to change the file pointer (steps 220, 222 and 224).

To change the file pointer for the I table, the I table indicated by the changed file pointer is read to obtain the file offset (FILE_OFFSET) and then the value of the file offset (FILE_OFFSET) is used to change the read pointer of MPEG 1 file 12 (step 226) accordingly.

In the MPEG 1 file, the I-frame packet number (PIC_NUM) * the video packet size (V_PACKSIZE)+the audio packet number (AUD_NUM) * the audio packet size (A_PACKSIZE) are read from the thus-changed read pointer to then transmit the video packet only (steps 224 and 226). Accordingly, only I frames contained in the GOPs stored in MPEG file 12 are transmitted. Then, the I table pointer is again decreased by the I table size (I_TABLE_SZ) and the above operations are repeated (step 228).

In case of returning to the normal play mode during the fast reverse travelling, the I table pointer prior to the currently being transmitted GOP is read to obtain the file offset (FILE_OFFSET) and then the read pointer of MPEG 1 file 12 is changed into the file offset (FILE_OFFSET) value to return to the normal play mode.

Also, during the fast forward/reverse travelling controlling, the travelling speed is adjusted by the following relationship.

During the fast forward travelling, I_TABLE_PTR=I_TABLE_PTR+I_TABLE-SIZE * STEP_VALUE where the value (STEP_VALUE) is a positive integer.

During the fast reverse travelling, I_TABLE_PTR=I_TABLE_PTR−I_TABLE-SIZE * STEP_VALUE where the value (STEP_VALUE) is a positive integer.

At this time, in the above relationships, the larger the step value (STEP_VALUE), the faster the forward/reverse travelling speed, vice versa.

As described above in detail, according to the present invention, a simple I table (I_TABLE) is prepared in a VOD system using MPEG 1, thereby implementing a fast forward/reverse travelling for the video data of a moving picture in real-time processing and controlling the travelling speed by a step value, which is adoptable for another systems using MPEG 1.

What is claimed is:

1. A fast forward/reverse travelling controlling method comprising the steps of:

preparing an I table using a packet from a moving picture expert group (MPEG) file during a normal play mode;

increasing an I table pointer by an I table size based on said I table, and determining a size of a video packet to be transmitted using said I table, during a conversion from said normal play mode to a fast forward play mode, so that the video packet to be transmitted during the fast forward play mode always contains an I-frame; and decreasing said I table pointer by the I table size based on said I table, and determining a size of a video packet to be transmitted using said I table, during a conversion from said normal play mode to a fast reverse travelling mode, so that the video packet to be transmitted during the fast reverse travelling mode always contains an I-frame.

2. A fast forward/reverse travelling controlling method as claimed in claim 1, wherein said I table stores a GOP_NUM representing a group of picture (GOP) number, a FILE_OFFSET representing the start of the GOP, a GOP_IND which is an indicator of the start of the GOP, a PIC_NUM representing the number of packets of I-frames included in the GOP, and an AUD_NUM representing the number of audio packets inserted in the middle of the I-frames.

3. A fast forward/reverse travelling controlling method as claimed in claim 1, wherein said step of preparing the I table includes the steps of:

reading the packet from said MPEG file, setting an old data size prior to the start of a group of picture (GOP) as a file offset of said MPEG file if said read packet is a video packet and contains a start code of the GOP, calculating the number of I-frame packets included in the GOP and the number of audio packets inserted in the middle of I-frames, and repeatedly executing said setting and calculating steps up to the end of said MPEG file.

4. A fast forward/reverse travelling controlling method as claimed in claim 1, further comprising the steps of:

determining an I-frame packet number (PIC_NUM) * video packet size (V_PACKSIZE)+audio packet number (AUD_NUM) * audio packet size (A_PACKSIZE) from the I table; and obtaining the video packet to be transmitted during the fast forward play mode using said determination result.

5. A fast forward/reverse travelling controlling method as claimed in claim 1, further comprising the steps of:

determining an I-frame packet number (PIC_NUM) * video packet size (V_PACKSIZE)+audio packet number (AUD_NUM) * audio packet size (A_PACKSIZE) from the I table; and obtaining the video packet to be transmitted during the fast reverse travelling mode using said determination result.

6. A fast forward/reverse travelling controlling method as claimed in claim 1, further comprising the steps of:

opening an I table file indicated by said I table pointer to access said I table;

obtaining a file offset stored in the I table file; and changing a read pointer for MPEG files based on said file offset so that the read pointer is set to a start of a group of picture (GOP) in the MPEG file.

7. A fast forward/reverse travelling controlling method as claimed in claim 6, wherein a returning step to the normal play mode from the fast forward play mode is executed such that the I table pointer next to a currently being transmitted GOP is read to obtain a new file offset and then the read pointer is changed into a new file offset value.

8. A fast forward/reverse travelling controlling method as claimed in claim 6, wherein said step of increasing the I table pointer includes the step of:

increasing a fast forward travelling speed by multiplying an I table size value of the I table size by a predetermined step value.

9. A fast forward/reverse travelling controlling method as claimed in claim 1, further comprising the steps of:

opening an I table file indicated by said I table pointer to access said I table;

obtaining a file offset stored in the I table file; and changing a read pointer for MPEG files based on said file offset so that the read pointer is set to a start of a group of picture (GOP) in the MPEG file.

10. A fast forward/reverse travelling controlling method as claimed in claim 9, wherein a returning step to the normal play mode from the fast reverse travelling mode is executed such that the I table pointer prior to a currently being transmitted GOP is read to obtain a new file offset and then the read pointer is changed to a new file offset value.

11. A fast forward/reverse travelling controlling method as claimed in claim 9, wherein said step of decreasing the I table pointer includes the step of:

decreasing a fast reverse travelling speed by multiplying an I table size value of the I table size by a predetermined step value.

12. A fast forward/reverse travelling controlling method for a digital video-on-demand system, comprising the steps of:

preparing an I table using a packet from a moving picture expert group (MPEG) data file during a normal play mode;

reading said I table to transmit a video as an I table pointer is increased by an I table size based on said I table during a conversion from said normal play mode to a fast forward play mode; and reading said I table to transmit a video packet as said I table pointer is decreased by the I table size based on said I table during a conversion from said normal play mode to a fast reverse travelling mode, wherein said step of preparing the I table includes the steps of reading the packet from said MPEG data file, setting an old data size prior to the start of a group of pictures (GOP) as a file offset of said MPEG data file if said read packet is a video packet and contains a start code of the GOP, calculating the number of I-frame packets included in the GOP and the number of audio packets inserted in a middle of the I-frame packets, and rapidly executing said setting and calculating steps up to an end of said MPEG data file.

13. A fast forward/reverse travelling controlling method as claimed in claim 12, further comprising the steps of:

determining an I-frame packet number (PIC_NUM) * video packet size (V_PACKSIZE)+audio packet number (AUD_NUM) * audio packet size (A_PACKSIZE) from the I table; and obtaining the video packet to be transmitted during the fast forward play mode using said determination result.

14. A fast forward/reverse travelling controlling method as claimed in claim 12, further comprising the steps of:

determining an I-frame packet number (PIC_NUM) * video packet size (V_PACKSIZE)+audio packet number (AUD_NUM) * audio packet size (A_PACKSIZE) from the I table; and obtaining the video packet to be transmitted during the fast reverse travelling mode using said determination result.

15. A fast forward/reverse travelling controlling method as claimed in claim 12, wherein the video packet to be transmitted during the fast reverse travelling mode and the fast forward play mode always includes an I-frame.

* * * * *